(12) United States Patent
Kubo et al.

(10) Patent No.: US 7,817,520 B2
(45) Date of Patent: Oct. 19, 2010

(54) OPTICAL DISK DRIVE INCLUDING STEPPER POINTER INDICATING ROTATION OF STEPPING MOTOR

(75) Inventors: Hideki Kubo, Tokorozawa (JP); Kazuhiko Kameda, Tokorozawa (JP)

(73) Assignee: TEAC Corporation, Tama-shi, Tokyo (JP)

( * ) Notice: Subject to any disclaimer, the term of this patent is extended or adjusted under 35 U.S.C. 154(b) by 746 days.

(21) Appl. No.: 11/724,959

(22) Filed: Mar. 16, 2007

(65) Prior Publication Data
US 2007/0241716 A1    Oct. 18, 2007

(30) Foreign Application Priority Data
Mar. 22, 2006    (JP)    .............................. 2006-079657

(51) Int. Cl.
*G11B 11/00*    (2006.01)
(52) U.S. Cl. ................. 369/53.3; 369/53.42; 369/53.43
(58) Field of Classification Search ....................... None
See application file for complete search history.

(56) References Cited

U.S. PATENT DOCUMENTS

| | | | | |
|---|---|---|---|---|
| 4,710,691 | A * | 12/1987 | Bergstrom et al. | ........... 318/696 |
| 5,084,661 | A * | 1/1992 | Tanaka | ....................... 318/685 |
| 5,862,113 | A | 1/1999 | Tsuyuguchi | |
| 6,019,495 | A * | 2/2000 | Yamada et al. | ................. 701/37 |
| 6,222,340 | B1* | 4/2001 | Kawabata et al. | ........... 318/685 |
| 2004/0156288 | A1* | 8/2004 | Shigeta et al. | ........... 369/53.18 |
| 2004/0208093 | A1 | 10/2004 | Omori | |

FOREIGN PATENT DOCUMENTS

| | | |
|---|---|---|
| JP | 1-186198 A | 7/1989 |
| JP | 370497 A | 3/1991 |
| JP | 6296397 A | 10/1994 |

(Continued)

OTHER PUBLICATIONS

Notice of Grounds for Rejection (JP) dated Jan. 27, 2009, issued in corresponding Japanese Application No. 2006-079657.

(Continued)

*Primary Examiner*—Paul Huber
(74) *Attorney, Agent, or Firm*—Seed IP Law Group PLLC

(57) ABSTRACT

An optical disk drive capable of detecting occurrence of step-out or tooth jump in a mechanism for transferring an optical pickup. The optical pickup is transferred in a radial direction of the optical disk by means of a stepping motor. Upon receipt of a seeking operation command from a host machine, a control section drives the stepping motor by way of a controller, to thus cause the optical pickup to perform seek up to a target address. When logical contradiction has arisen in a stepper pointer showing the amount of rotation of the stepping motor, the control section determines that step-out or tooth jump has arisen. Moreover, even when a difference exists between an address indicated by the value of the stepper pointer and an actual address, step-out or tooth jump is determined to have arisen. When the step-out or tooth jump has arisen in the transfer mechanism, the rotational speed of a spindle motor or the rotational speed of the stepping motor is decreased.

15 Claims, 6 Drawing Sheets

FOREIGN PATENT DOCUMENTS

| | | |
|---|---|---|
| JP | 8-96535 A | 4/1996 |
| JP | 11-73719 A | 3/1999 |
| JP | 11-306701 A | 11/1999 |
| JP | 11-328830 A | 11/1999 |
| JP | 2003100041 A | 4/2003 |
| JP | 2003109332 A | 4/2003 |
| JP | 2003-178478 A | 6/2003 |
| JP | 2004-118912 A | 4/2004 |
| JP | 2004-234799 A | 8/2004 |
| JP | 2005-085410 A | 3/2005 |
| JP | 2005243141 A | 8/2005 |
| JP | 2005343413 A | 12/2005 |

OTHER PUBLICATIONS

Notice of Grounds for Rejection (JP) mailed Jun. 16, 2009, issued in Japanese Application No. 2006-079657, filed on Mar. 22, 2006.
English Language Translation of Japanese Office Action relating to Japanese Patent Application No. 2006-079657, mailed Mar. 2, 2010, 1 page.
Japanese Office Action relating to Japanese Patent Application No. 2006-079657, mailed Mar. 2, 2010, 2 pages.

* cited by examiner

OPTICAL DISK DRIVE INCLUDING STEPPER POINTER INDICATING ROTATION OF STEPPING MOTOR

PRIORITY INFORMATION

This application claims priority to Japanese Patent Application No. 2006-79657, filed on Mar. 22, 2006, which is incorporated herein by reference in its entirety.

BACKGROUND

1. Technical Field

The present invention relates to an optical disk drive, and more particularly to transfer control of an optical pickup.

2. Related Art

An optical disk drive has hitherto performed seeking operation by means of transferring an optical pickup in a radial direction of an optical disk by means of a stepping motor.

FIGS. 5 and 6 show the configuration of an optical disk drive and the configuration of a transfer mechanism, which are described in the related art shown in JP2003-100041A. An optical pickup 310 has a semiconductor laser (LD) and emits a laser beam modulated according to recording data, thereby recording data on an optical disk 10; and emits a laser beam of reproducing power and receives light reflected from the optical disk 10, to thus generate a reproduced signal.

A decoder 320 decodes the reproduced signal from the optical pickup 310; generates an address signal or the like; and supplies a control section 330 with the thus-generated address signal or the like.

The control section 330 comprises a CPU, ROM, RAM, and the like, and controls seeking operation. Specifically, upon receipt, from a host machine such as a personal computer or the like, of a seeking operation command including a target address corresponding to a destination where the optical pickup 310 is to be transferred, the control section 330 computes the number of pulse signals to be imparted to a stepping motor 100, and supplies a controller 340 with the number of pulse signals. In accordance with the command from the control section 330, the controller 340 supplies a driver 350 with a drive control signal. In accordance with the drive control signal, the driver 350 controls the number of rotations of and the rotational speed of the stepping motor 100.

As shown in FIG. 6, the stepping motor 100 is provided with a lead screw 110 in which a helical groove is formed at a given pitch P, and the lead screw 110 is mounted in parallel with the radial direction of the optical disk 10. The optical pickup 310 is disposed so as to be movable along the groove of the lead screw 110. Every time the stepping motor 100 rotates one turn, the optical pickup 310 is moved in the radial direction of the optical disk 10 at one pitch P of the lead screw 110.

With such a configuration, the control section 330 computes a difference between the current address supplied from the decoder 320 at the end of seeking operation and the target address received from the host machine at the commencement of seeking operation. When the computed amount of displacement exceeds an allowable amount, the stepping motor 100 is determined to be out of step (hereinafter called "step-out"), and the rotational speed of the stepping motor 100 is reduced. Here, the term "step-out" means a phenomenon in which the torque of the stepping motor 100 becomes deficient for reasons of an increase in a pulse frequency applied to the stepping motor 100 and which the stepping motor 100 does not rotate even when the pulse voltage is applied to the stepping motor 100.

Meanwhile, it is desired to be able to prevent dissociation of the current address from the target address by reliable detection of the step-out during seeking operation rather than by detection of the step-out at the end of seeking operation.

Even when the step-out is detected at the end of seeking operation, detection of step-out with higher accuracy is desired.

Further, when the optical pickup 310 is transferred, in addition to step-out, tooth jump; namely, disengagement of a teeth section 310a provided in the optical pickup 310 from the lead screw, may arise. Reliable detection of such tooth jump is desired.

SUMMARY

The present invention provides an apparatus which enables reliable detection of occurrence of step-out or tooth jump, which could arise during transfer of an optical pickup by use of a stepping motor, thereby preventing dissociation of a current address from a target address.

An optical disk drive of the present invention comprises a stepping motor; a transfer mechanism which engages with the stepping motor and transfers an optical pickup in a radial direction of an optical disk by means of rotation of the stepping motor; and control means for detecting step-out or tooth jump in the transfer mechanism from a value of a stepper pointer showing the amount of rotation of the stepping motor.

In one embodiment of the present invention, the control means detects step-out or tooth jump in the transfer mechanism when the value of the stepper pointer has exceeded a predetermined lower limit or upper limit.

Moreover, in another embodiment of the present invention, the control means detects step-out or tooth jump in the transfer mechanism from an error between an address of the optical pickup achieved after completion of transfer operation performed by the transfer mechanism and an address indicated by the value of the stepper pointer.

In the present invention, dissociation arising between the value of the stepper pointer and the actual position of the optical pickup is utilized. Specifically, the stepper pointer indicates the amount of rotation of the stepping motor from the innermost track position thereof determined by integration of seek commands. The stepper pointer does not show the amount of actual movement of the optical pickup or the amount of rotation of a screw, but only counts the number of pulse signals input to the stepping motor. Consequently, when step-out or tooth jump has arisen, an error arises between the value of the stepper pointer and the actual position of the optical pickup. Conversely, occurrence/nonoccurrence of step-out or tooth jump is detected by use of the error. Since the value of the stepper pointer is a cumulative value, the present invention can be said to be able to detect that step-out or tooth jump arose in seeking operations of the past.

According to the present invention, the step-out or tooth jump can be detected with high accuracy from the value of the stepper pointer.

The invention will be more clearly comprehended by reference to the embodiments provided below. However, the scope of the invention is not limited to the embodiments.

BRIEF DESCRIPTION OF THE DRAWINGS

Preferred embodiments of the present invention will be described in detail based on the following figures, wherein.

DETAILED DESCRIPTION

Figure 5:
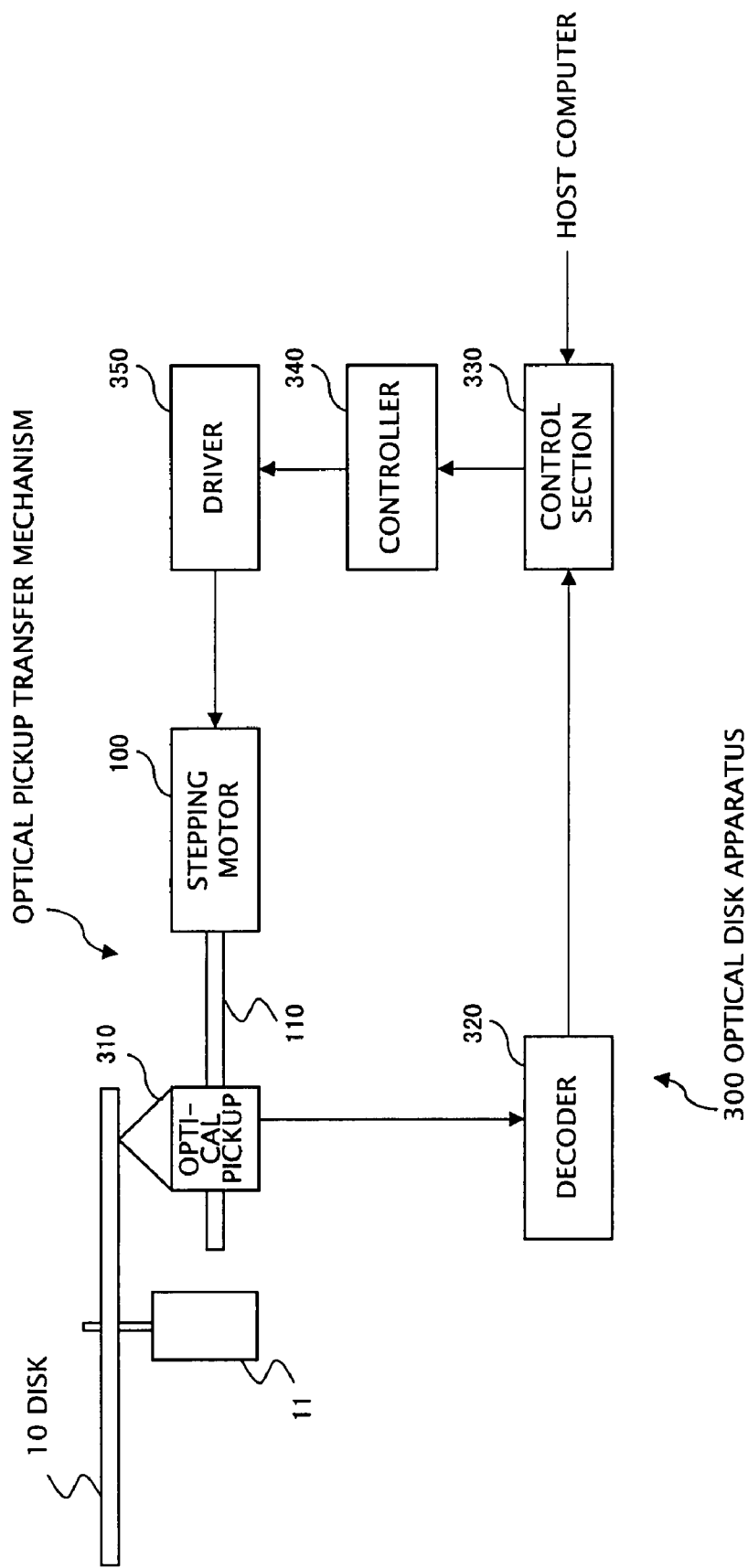
FIG. 5 is a block diagram of a related-art apparatus.

Embodiments of the present invention will be described hereinbelow by reference to the drawings. Those members identical with those of the related-art apparatus shown in FIG. 5 are assigned the same reference numerals.

First Embodiment

Figure 1:
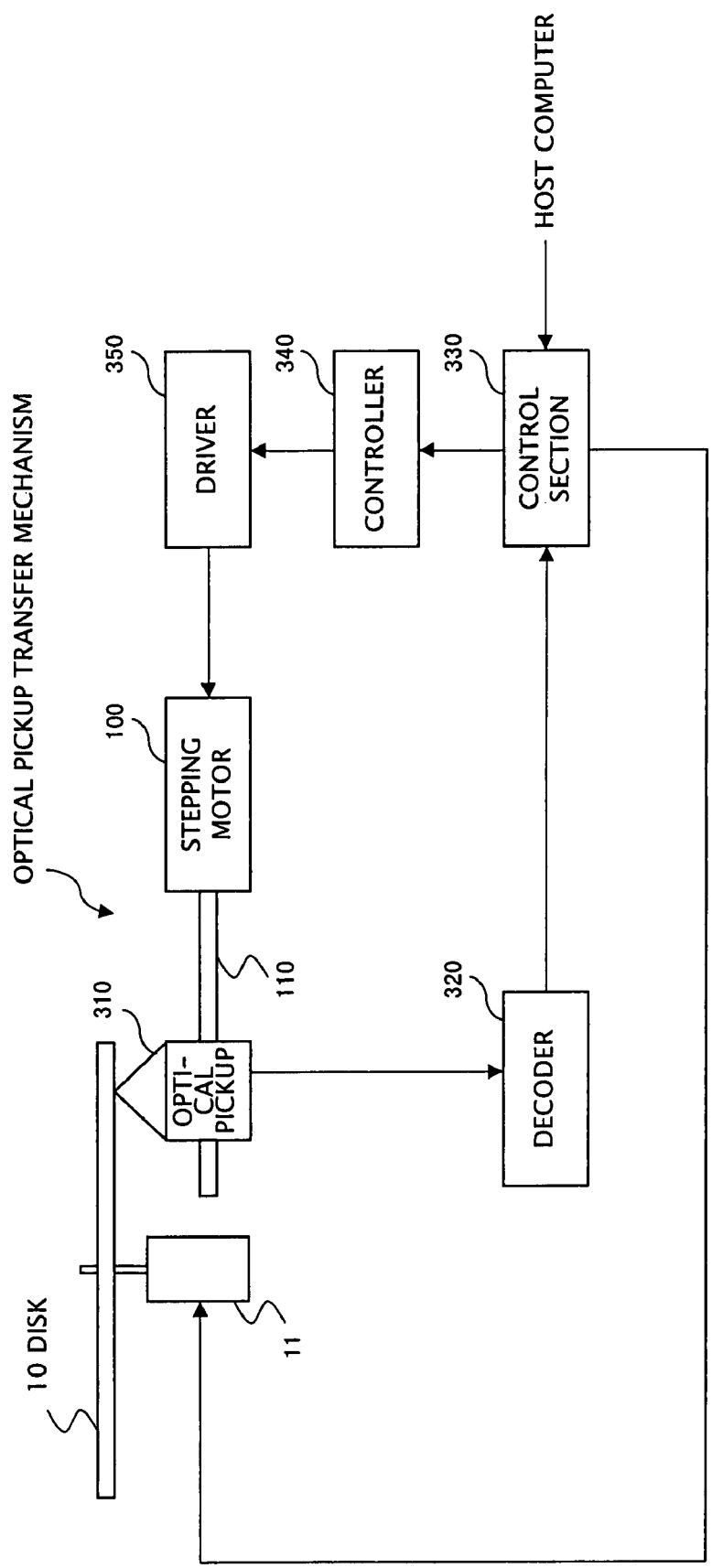
FIG. 1 is a block diagram of an optical disk drive of an embodiment of the present invention.
Figure 6:
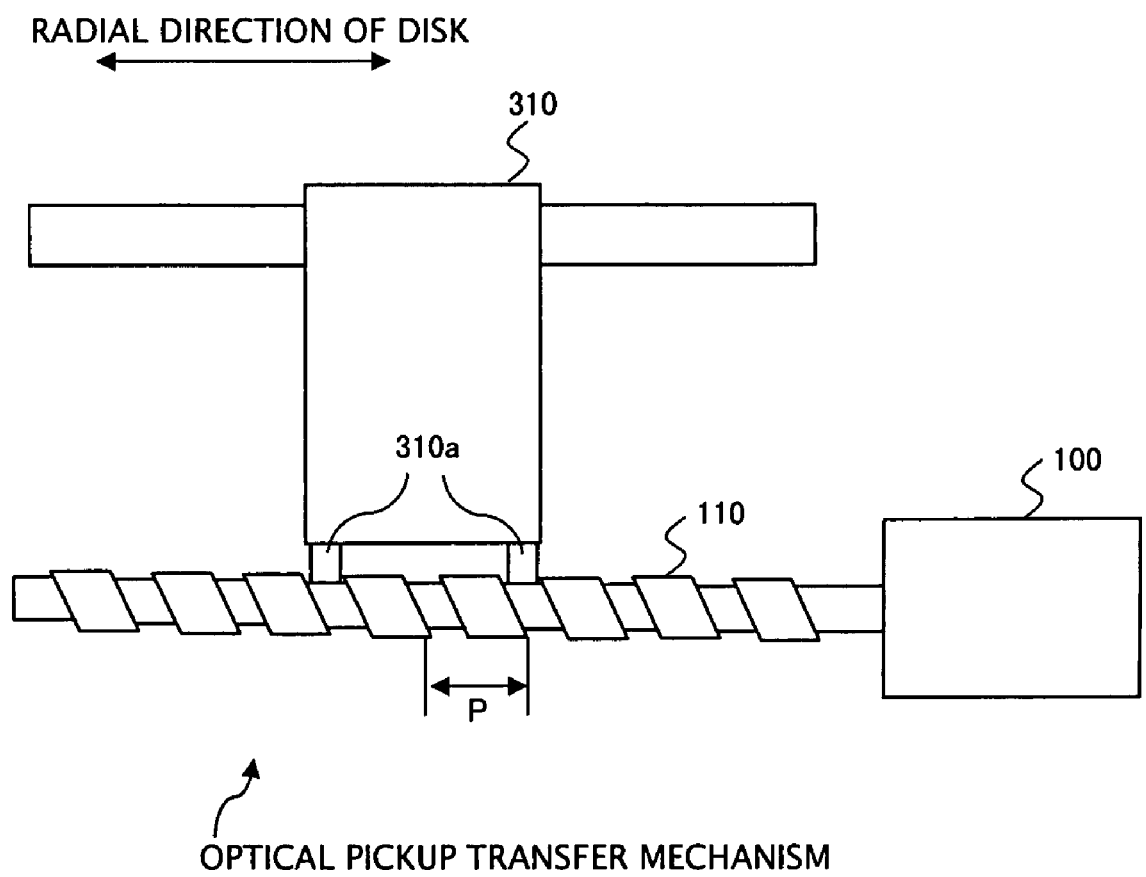
FIG. 6 is a descriptive view of a transfer mechanism of the related-art apparatus.

FIG. 1 shows the configuration of an optical disk drive of a present embodiment. A seeking operation start command from a host machine, such as a personal computer or the like, is supplied to a control section 330. The control section 330 has a CPU, ROM, RAM, and the like, and supplies a controller 340 with a control signal. Rotation of a stepping motor 100 is controlled by the controller 340 and a driver 350. As shown in FIG. 6, an optical pickup 310 is coupled to a lead screw 110 by way of a teeth section 310a, and is moved in a radial direction of an optical disk 10 by means of rotation of the lead screw 110. The optical pickup 310 irradiates the optical disk 10, which is rotationally driven by a spindle motor 11, with a laser beam of recording power, to thus record data; or irradiates the optical disk 10 with a laser beam of reproducing power, to thus reproduce recorded data. A reproduced signal from the optical pickup 310 is supplied to a decoder 320. The decoder 320 decodes the reproduced signal and supplies decoded data and address data to the control section 330.

In accordance with the seeking operation start command from the host machine, the control section 330 moves the optical pickup 310; and subsequently compares the current address of the optical pickup 310 supplied from the decoder 320 with a target address, thereby determining whether or not step-out or tooth jump has arisen, from the amount of a displacement between the target address and the current address. Moreover, the controller 340 has a stepper pointer which counts the number of pulse signals input to the stepping motor 100, to thus monitor the amount of rotation, and the control section 330 determines, by utilization of a value from a stepper pointer, whether or not the step-out or the tooth jump has arisen. The stepper pointer usually shows the amount of rotation from the innermost track position for the stepping motor 100 determined through seek command integration. The stepper pointer takes a micro-step as a unit. The innermost track position on the optical pickup 310 is taken as zero, and the stepper pointer becomes greater toward an outer periphery. For instance, one micro-step corresponds to one-$256^{th}$ of the rotation of the stepping motor 100, and the optical pickup 310 moves over 7.8 μm in the radial direction of the optical disk by one micro-step. A movable range of the optical pickup 310 is a total of 38000 μm from the innermost track position to the outermost track position. When the optical pickup 310 is situated at the outermost track position, the stepper pointer assumes a value of 4864. Consequently, the lower limit of the stepper pointer corresponds to 0, and the upper limit corresponds to 4864. In a case where the optical pickup 310 is not actually situated at the outermost track as a result of occurrence of step-out or tooth jump in spite of the optical pickup having to be situated at the outermost track according to the value of the stepper pointer, when the seeking operation start command for causing the optical pickup 310 to perform further seeking operation toward the outer periphery is received from the host machine, the stepper pointer assumes a value which exceeds an upper limit of 4864, so that logical contradiction arises. When such a logical contradiction has arisen, the control section 330 determines that step-out or tooth jump has arisen. Logical contradiction will be specifically described as follows.

First, when the optical pickup 310 is transferred toward the outer track over 10 mm, an anomaly such as a step-out or tooth jump of 1 mm is assumed to inevitably arise. Further, when the optical pickup 310 is transferred toward an inner track, no anomaly, such as step-out or tooth jump, is assumed to arise. By use of such a transfer mechanism, a seek of 10 mm is repeatedly performed toward the inner track side and the outer track side. When the seek toward the outer track side is performed, the stepping motor 100 is rotated by an amount of (10 mm+1 mm). Transfer is additionally performed by an amount of ±1 mm to compensate for step-out or tooth jump. When a seek is performed toward the inner track side, step-out or tooth jump does not arise, and hence rotation of 10 mm is effected. Specifically, when the optical pickup makes one round trip between the inner track side and the outer track side, the value of the stepper pointer becomes deviated toward the outer track side by 1 mm with reference to the actual position of the optical pickup 310. When the seek is iterated between the inner track side and the outer track side several times, the value of the stepper pointer is deviated toward the outer track side in increments of 1 mm regardless of the fact that the optical pickup 310 is situated at the same physical position. An error is accumulated and finally exceeds the upper limit of the stepper pointer. At this time, the previously-described logical contradiction arises. Namely, the actual position of the optical pickup 310 differs from the location indicated by the value of the stepper pointer, or the stepper pointer fails to show a value which is to be originally indicated, and shows another value which, is not to be assumed originally. When such a logical contradiction has arisen, the control section 330 determines that step-out or tooth jump has arisen. Specifically, when a seeking operation command—by means of which the value of the stepper pointer exceeds the upper limit—has been received, an error message is output from an IC (i.e., the controller 340) which manages the stepper pointer, and the control section 330 detects issuance of this error message, thereby determining that step-out or tooth jump has arisen.

Figure 2:
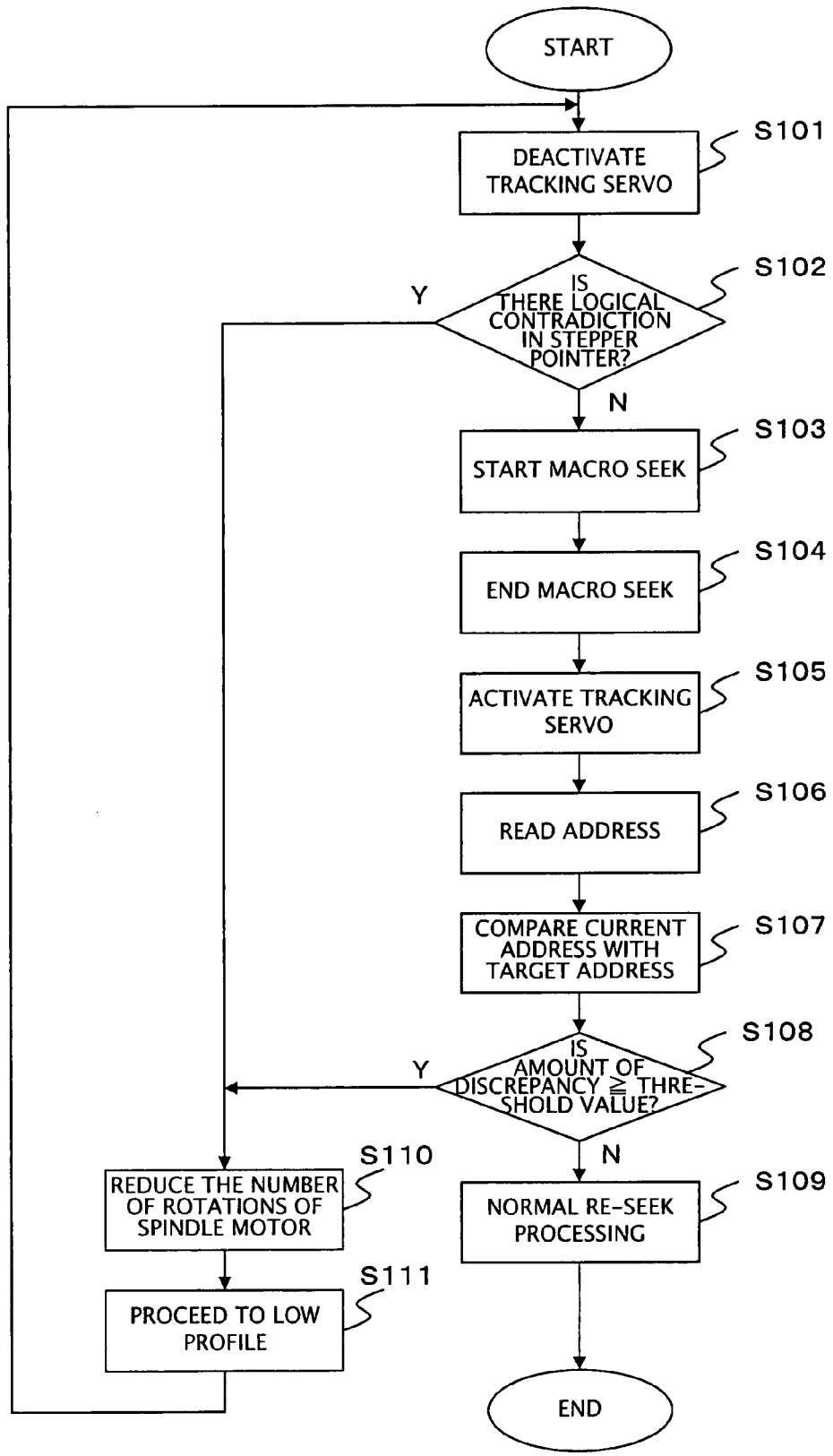
FIG. 2 is a processing flowchart of the embodiment.

FIG. 2 shows a processing flowchart of the present embodiment. First, when the seeking operation start command is received from the host machine, a tracking servo is deactivated (S101), and a determination is made as to whether or not the stepper pointer has caused logical contradiction (S102). As mentioned above, there may arise a case where, when step-out or tooth jump has occurred, an error arises between the position indicated by the value of the stepper pointer and the actual position of the optical pickup 310, whereupon the value of the stepper pointer reaches the upper limit by the error accumulated by the seeking operations performed in the past. In such a case, logical contradiction arises at a point in time when the seeking operation command from the host machine has been received, this seek command cannot be performed, and the controller 340 issues an error message. Upon receipt of such an error message, the control section 330 determines that logical contradiction has arisen in the stepper pointer. When logical contradiction has arisen (YES is selected in S102), the control section 330 performs macro seek by changing seek conditions. Specifically, the number of rotations (rotational speed) of the spindle motor 11 is reduced (S110). When the optical disk 10 is rotationally driven at 8× rotational speed by the spindle motor 11, the rotational speed is reduced to 6× rotational speed, or 4× rotational speed, or the like. Reducing the rotational speed of the spindle motor 11 is intended for dampening oscillation that serves as an inducement for step-out or tooth jump. When a mass eccentricity exists in the optical disk 10, the spindle motor 11 causes oscillation during high-speed rotation, and the oscillation propagates to the transfer mechanism such as the optical pickup 310, the teeth section 310a, the lead screw 110, and the like, which in turn induces step-out or tooth jump. Therefore, oscillation can be dampened by reducing the rotational speed of the spindle motor 11. In addition to a reduction in the number of rotations of the spindle motor 11, drive characteristics (a profile) of the stepping motor 100 are changed from a normal profile to a low profile (S111).

As will be described later, the maximum rotational speed of the stepping motor 100 is reduced by the low profile. The principal cause of step-out is a deficiency in torque, and the deficiency in torque is compensated by decreasing the maximum rotational speed. After the rotational speed of the spindle motor 11 and that of the stepping motor 100 have been altered, the optical pickup 310 is transferred to the innermost track of the optical disk 10, and the address of the optical pickup 310 is reset. Processing subsequent to S101 is again performed, to thus effect macro seek. The term "macro seek" signifies transfer of the optical pickup 310 in the radial direction of the optical disk 10. Since the rotational speed of the spindle motor 11 and the rotational speed of the stepping motor 100 have decreased during performance of macro seek, the chance of seek being able to be performed up to the target address without involvement of step-out or tooth jump is increased.

In the meantime, when logical contradiction is determined not to have arisen in the stepper pointer in S102, macro seek is commenced by driving the stepping motor 100 (S103). As mentioned above, the term "macro seek" signifies transfer of the optical pickup 310 in the radial direction of the optical disk 10. In contrast, a term "micro jump" to be described later means movement of only an object lens, which is mounted on the optical pickup 310 and condenses a laser beam emitted from the laser diode, in a radial direction without movement of the optical pickup 310. The control section 330 receives a target address from the host machine; computes a distance from the current address required to achieve the target address (i.e., a travel distance); computes a required number of pulse signals; and drives the stepping motor 100. A rotational angle of the stepping motor 100 is specified by the number of pulse signals, and the rotational speed of the same is specified by a pulse frequency. The amount of rotation of the stepping motor 100 is managed by the stepper pointer. When the stepping motor 100 rotates one-$256^{th}$, the stepper pointer is incremented by one micro step. After completion of macro seek (S104), tracking servo is again activated (S105). The current address achieved after completion of macro seek is read by the decoder 320 (S106), and the address is supplied to the control section 330. The control section 330 compares the current address achieved at the completion of the macro seek supplied from the decoder 320 with the target address supplied from the host machine (S107). When the amount of difference between the target address and the current address is a predetermined allowable threshold value; e.g., 2.0 mm, or more (YES is selected in S108), logical contradiction has not yet arisen, but step-out or tooth jump is determined to have arisen one time or several times during the course of seeking operation. Like processing performed at the time of occurrence of logical contradiction, the rotational speed of the spindle motor 11 is decreased, and the rotational speed of the stepping motor 100 is reduced (S110, S111). Subsequently, the address of the optical pickup 310 may also be reset as mentioned above, and processing subsequent to S101 may also be performed again, or processing subsequent to S101 may also be performed by an amount corresponding to the difference. When the amount of difference between the target address and the current address is smaller than the allowable threshold value (NO is selected in S108), neither step-out nor tooth jump has arisen, and macro seek is determined to have completed normally, and ordinary re-seek processing is performed (S109). During ordinary re-seek processing, the macro seek is gain performed according to the amount of difference between the target address and the current address, or there is performed micro jump for driving only the objective lens.

Figure 3:
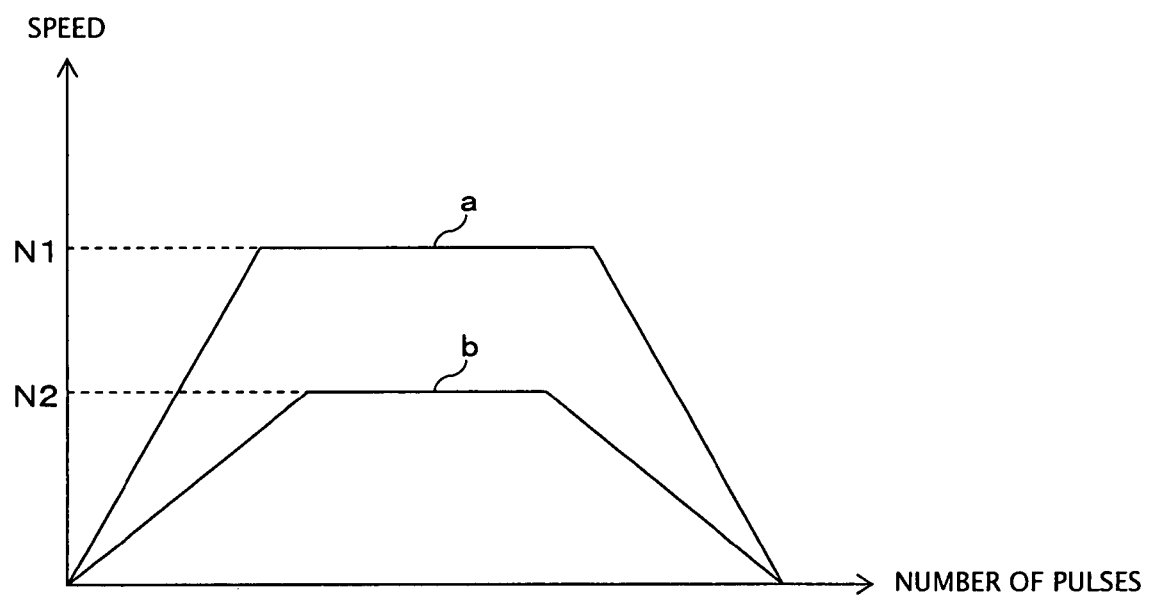
FIG. 3 is a descriptive view of a low profile of the embodiment.

FIG. 3 shows an example low profile employed in S111 of FIG. 2. A horizontal axis represents the number of pulse signals supplied from the driver 350, and the vertical axis represents the rotational speed of the stepping motor 100. Reference symbol "a" in the drawing represents a normal profile, and reference symbol "b" in the drawing depicts a low profile. According to the ordinary profile, the maximum rotational speed is N1. However, according to the low profile, the maximum rotational speed is N2 (N1>N2). Moreover, acceleration of the low profile is smaller than acceleration of the ordinary profile. Consequently, occurrence of step-out or tooth jump can be prevented by means of changing the profile to the low profile.

As mentioned above, in the present embodiment, attention is paid to the value of the stepper pointer showing the amount of rotation of the stepping motor 100, and logical contradiction arises in the value of the stepper pointer. Specifically, when the value of the stepper pointer does not reflect the actual position of the optical pickup 310 and there is received a seeking operation command for moving the optical pickup further toward the outer track in spite of the upper limit having already been reached or when a seek command for moving the optical pickup further toward the inner track is received in spite of the value of the stepper pointer having already reached the lower limit, step-out or tooth jump is determined to have arisen during macro seeking operation of the past. When the step-out or tooth jump is determined to have arisen, macro seek is performed by altering the seek conditions, thereby preventing dissociation of the current address from the target address.

Second Embodiment

In the first embodiment, step-out or tooth jump is detected from the value of the stepper pointer acquired before macro seeking operation. However, the present embodiment describes a case where step-out or tooth jump is also detected from the value of the stepper pointer even at the end of macro seek.

Figure 4:
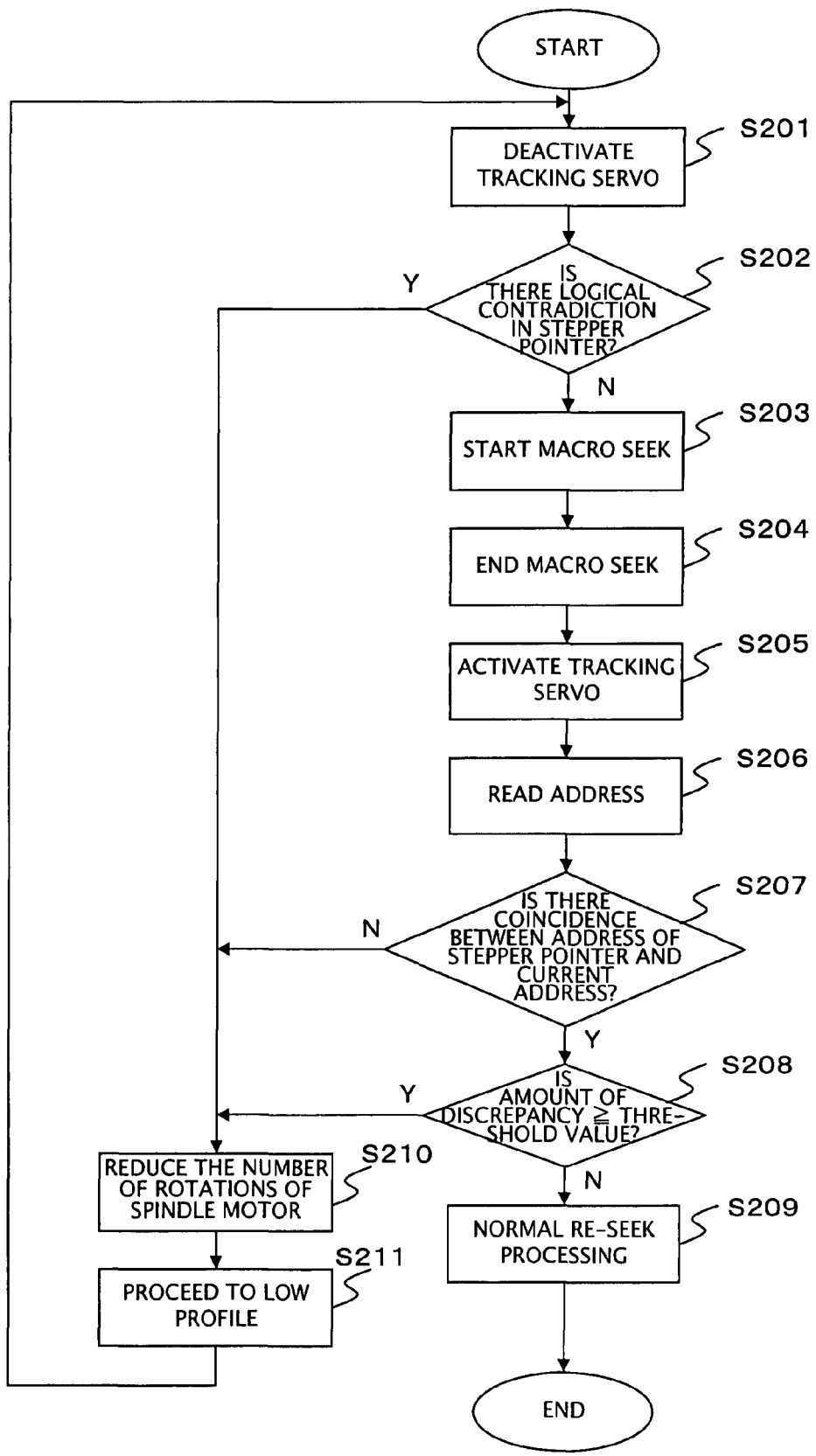
FIG. 4 is a processing flowchart of another embodiment.

The configuration of the optical disk drive of the present embodiment is identical with that shown in FIG. 1, and FIG. 4 shows a processing flowchart of the present embodiment. Processing pertaining to S201 to S206 is analogous to that pertaining to S101 to S106 in FIG. 2. Before commencement of macro seek, a determination is made as to whether or not the stepper pointer has caused logical contradiction. When the logical contradiction has arisen, step-out or tooth jump is determined to have arisen, and seek conditions are altered (S210, S211).

Meanwhile, when no logical contradiction has arisen in the stepper pointer, macro seek is commenced. After completion of macro seek (S203, S204), tracking servo is activated (S205), and the current address is read (S206). Subsequently, a determination is made as to whether or not the address indicated by the value of the stepper pointer after completion of macro seek coincides with the current address read in S206 (S207).

As mentioned above, when step-out or tooth jump has arisen, an error arises between a position or address indicated by the value of the stepper pointer value and the actual position or address of the optical pickup 310. A determination is made as to whether or not the addresses coincide with each other. When coincidence is not found, step-out or the tooth jump is determined to have arisen (NO is selected in S207), and processing proceeds to processing for altering seek conditions. A determination as to whether or not coincidence exists between the addresses is rendered by comparing the difference between the addresses with a predetermined allowable value. When there is no difference or there is a difference which falls within the range of an allowable value, the addresses are determined to coincide with each other. When the difference exceeds the allowable range, the addresses are determined not to coincide with each other. For instance, it is assumed that a seeking operation command for effecting seek toward an outer track by a stepper pointer value of 1280 (10 mm toward an outer track) has been received and that a seek deficiency of 1 mm has arisen for reasons of step-out or the tooth jump as a result of performance of macro seek. In this case, the optical pickup 310 is actually situated at a position to which the optical pickup has been moved by 9 mm toward the outer track. This position differs from 10 mm which corresponds to a stepper pointer value of 1280. Accordingly, when such an error is present, step-out or the tooth jump is determined to have arisen. When the two addresses coincide with each other (YES is selected in S207), the amount of difference between the target address and the current address is compared with the predetermined allowable threshold value, as in the case of processing subsequent to S108 of FIG. 2 (S208). When the amount of difference is equal to or greater than the allowable threshold value, step-out or the tooth jump is determined to have arisen. Attention is paid to the fact that in S207 the address corresponding to the value of the stepper pointer is compared with the address where the optical pickup 310 is actually situated; and that in S208 the target address received according to the seeking operation command is compared with the actual address of the optical pickup 310. When NO is determined in S207 and YES is determined in S208, the address of the optical pickup 310 may be reset as mentioned above after the seek conditions have been altered in S210 and S211, or processing subsequent to S201 may also be performed by the amount of difference between the target address and the current address.

Although the embodiments of the present invention have been described above, the present invention is not limited to them and is susceptible to various modes.

For example, in the present embodiment, step-out and tooth jump are detected in accordance with the value of the stepper pointer. However, in parallel with this detection method, the step-out and the tooth jump may also be detected according to another method. When a tooth hop has arisen, there may arise a case where the level of a focus error signal FE is increased or the focus servo becomes disabled (i.e. enters a focus-down state) as a result of abrupt movement of the objective lens of the optical pickup 310 in a focusing direction. Accordingly, when the level of the focus error signal FE has exceeded a predetermined value during macro seeking operation or when the focus servo has become disabled, tooth jump is determined to have arisen. Specifically, through processing pertaining to S203 shown in FIG. 4, step-out or tooth jump may also be detected by means of making a determination as to whether or not the focus servo becomes disabled during macro seeking operation.

Criteria for detection of step-out or tooth jump are summarized as follows.

(1) A case where logical contradiction has arisen in the value of the stepper pointer (when the lower limit or the upper limit has been exceeded).

(2) A case where focus servo has entered focus down.

(3) A case where a difference exists between an address indicated by the value of a stepper pointer and an address where the optical pickup is situated.

(4) A case where a difference exists between the target address and the actual address of an optical pickup.

Step-out or tooth jump may also be detected by use of all of these criteria or by an arbitrary combination of the criteria.

In the present embodiment, when step-out or tooth jump is determined to have arisen, the rotational speed of the spindle motor 11 is decreased, and the rotational speed of the stepping motor 100 is decreased. However, it may be the case that only the rotational speed of the spindle motor 11 is decreased, or only the rotational speed of the stepping motor 100 is decreased.

Moreover, when step-out or tooth jump is still determined to have arisen in spite of the macro seek being performed by decreasing the rotational speed of the spindle motor 11 or decreasing the rotational speed of the spindle motor 11 and the rotational speed of the stepping motor 100, the rotational speed of the spindle motor 11 is further decreased or both the rotational speed of the spindle motor 11 and the rotational speed of the stepping motor 100 are further decreased. First, when step-out or the tooth jump is still determined to have arisen in spite of the macro seek being performed by decreasing the rotational speed of the spindle motor 11, the rotational speed of the stepping motor 100 may be decreased. For instance, when step-out or tooth jump is determined to have arisen during the first macro seek or after completion of the macro seek, the rotational speed of the spindle motor 11 is decreased from 8× rotational speed to 6× rotational speed, thereby reperforming macro seek. When the step-out or the tooth jump is still determined to have arisen during reperformance of the macro seek (the second macro seek) or after completion of macro seek, the rotational speed of the stepping motor 100 is decreased by one step. When the step-out or the tooth jump is determined to have arisen during the first macro seek or after completion of the macro seek, the rotational speed of the spindle motor 11 is decreased from 8× rotational speed to 6× rotational speed, thereby reperforming macro seek. When the step-out or the tooth jump is determined to have arisen during reperformance of the macro seek (the second macro seek) or after completion of the macro seek, the rotational speed of the spindle motor is further decreased from 6× rotational speed to 4× rotational speed, thereby reperforming macro seek.

Further, in a case where macro seek is reperformed by altering the seek conditions; for example, by decreasing the rotational speed of the spindle motor 11, the number of times macro seek is normally completed is counted when the macro seek is completed without involvement of the step-out or tooth jump. When the count has reached a given number of times (e.g., 100 times), the seek conditions may also be restored to the original conditions; namely, the original rotational speed. The reason for this is the potential of, in a case where macro seek has continually been successful a given number of times, macro seek being able to be performed normally even when the original rotational speed is restored. For instance, when the rotational speed of the spindle motor 11 is decreased from 8× rotational speed to 6× rotational speed, to thus perform macro seek, and when the macro seek can have been continually completed normally 10 times in accordance with the seeking operation command from the host machine, the control section 330 restores the rotational speed of the spindle motor 11 from 6× rotational speed to 8× rotational speed. Upon receipt of the next macro seeking operation command from the host machine, the control section performs macro seek under conditions of 8× rotational speed. When macro seek can have been normally completed continually 100 times by decreasing the rotational speed of the spindle motor 11 and the rotational speed of the stepping motor 100, the rotational speed of the spindle motor 11 may be restored to the original rotational speed; the rotational speed of the stepping motor 100 may be restored to the original rotational speed; or both the rotational speed of the spindle motor 11 and the rotational speed of the stepping motor 100 may be restored to their original rotational speeds. For instance, when macro seek is normally completed continually 100 times after the rotational speed of the spindle motor 11 has been decreased from 8× rotational speed to 6× rotational speed and the rotational speed of the stepping motor 100 has been decreased from the maximum speed N1 to N2, only the rotational speed of the spindle motor 11 is restored from 6× rotational speed to 8× rotational speed.

Moreover, when the step-out or tooth jump is determined to have re-arisen after the original rotational speed has been restored because of the macro seek having been normally completed continually a predetermined number of times (e.g., 100 times as mentioned above, but the number of times may also be set arbitrarily) after alteration of the seek conditions, it goes without saying that the rotational speed of the spindle motor 11 or both the rotational speed of the spindle motor 11 and the rotational speed of the stepping motor 100 are decreased. However, when decreasing of the rotational speed and restoration of the rotational speed are performed repeatedly a predetermined number of times, the macro seek cannot be performed stably. Accordingly, when the number of repetitions has reached a predetermined number of times (e.g., five times), the rotational speed of the spindle motor 11 is preferably maintained at a decreased level or both the rotational speed of the spindle motor 11 and the rotational speed of the stepping motor 100 are maintained at decreased levels. For instance, the rotational speed of the spindle motor 11 is decreased from 8× rotational speed to 6× rotational speed, and the macro seek has normally been completed continually 100 times. For this reason, the rotational speed is restored from 6× rotational speed to 8× rotational speed. However, the step-out or the tooth jump has rearisen, and the rotational speed is again decreased from 8× rotational speed to 6× rotational speed. When these operations are repeated a total of five times, macro seek is performed in subsequent operation while the rotational speed of the spindle motor 11 is fixed to 6× speed.

It would be better to previously store in memory of the control section 330 or make rewritable a threshold number of times (e.g., 100 times) used for restoring the rotational speed from a decreased level and a threshold number of repetitions (e.g., five times) used for fixing the rotational speed at a decreased level.

What is claimed is:

1. An optical disk drive comprising:
    a stepping motor;
    a transfer mechanism which engages with the stepping motor and transfers an optical pickup in a radial direction of an optical disk by means of rotation of the stepping motor; and
    a control means for detecting an anomaly in the transfer mechanism from a value of a stepper pointer showing the amount of rotation of the stepping motor.

2. The optical disk drive according to claim 1, wherein the control means detects an anomaly in the transfer mechanism when the value of the stepper pointer has exceeded a predetermined lower limit or upper limit.

3. The optical disk drive according to claim 1, wherein the control means detects an anomaly in the transfer mechanism from an error between an address of the optical pickup achieved after completion of transfer operation performed by the transfer mechanism and an address indicated by the value of the stepper pointer.

4. The optical disk drive according to claim 1, wherein, when an anomaly in the transfer mechanism is not detected from the value of the stepper pointer, the control means detects the anomaly in the transfer mechanism from a difference between an address of the optical pickup achieved after completion of transfer operation performed by the transfer mechanism and a target address.

5. The optical disk drive according to claim 2, wherein the control means causes the transfer mechanism to perform transfer operation by altering transfer conditions when the anomaly has been detected.

6. The optical disk drive according to claim 3, wherein the control means causes the transfer mechanism to reperform transfer operation by altering transfer conditions when the anomaly has been detected.

7. The optical disk drive according to claim 5, wherein the alteration of the transfer conditions is a decrease in a rotational speed of a spindle motor which rotationally drives the optical disk.

8. The optical disk drive according to claim 5, wherein the alteration of the transfer conditions is a decrease in a rotational speed of the stepping motor.

9. The optical disk drive according to claim 6, wherein the alteration of the transfer conditions is a decrease in a rotational speed of a spindle motor which rotationally drives the optical disk.

10. The optical disk drive according to claim 6, wherein the alteration of the transfer conditions is a decrease in a rotational speed of the stepping motor.

11. The optical disk drive according to claim 1, wherein the control means detects an anomaly in the transfer mechanism when logical contradiction has arisen in the value of the stepper pointer.

12. The optical disk drive according to claim 5, wherein, when the number of times transfer is normally completed under altered transfer conditions has reached a predetermined number of times after the transfer mechanism has performed transfer operation by altering the transfer conditions, the control means restores the transfer conditions to original transfer conditions.

13. The optical disk drive according to claim 6, wherein, when the number of times transfer is normally completed under altered transfer conditions has reached a predetermined number of times after the transfer mechanism has performed transfer operation by altering the transfer conditions, the control means restores the transfer conditions to original transfer conditions.

14. The optical disk drive according to claim 1, wherein the anomaly in the transfer mechanism is step-out or tooth jump.

15. The optical disk drive according to claim 2, wherein the control means detects the anomaly at a point in time when a seeking operation start command has been received from a host machine.

\* \* \* \* \*

UNITED STATES PATENT AND TRADEMARK OFFICE
CERTIFICATE OF CORRECTION

PATENT NO. : 7,817,520 B2
APPLICATION NO. : 11/724959
DATED : October 19, 2010
INVENTOR(S) : Hideki Kubo et al.

It is certified that error appears in the above-identified patent and that said Letters Patent is hereby corrected as shown below:

On the Title Page Item 56
"JP 2005243141 A 8/2005" should read, --JP 2005243141 A 9/2005--.

Signed and Sealed this

Seventh Day of December, 2010

David J. Kappos
*Director of the United States Patent and Trademark Office*